(12) United States Patent
Toya et al.

(10) Patent No.: US 10,260,449 B2
(45) Date of Patent: Apr. 16, 2019

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Masanori Toya, Toyota (JP); Kazuya Oshima, Toyota (JP); Yoshikazu Yamamoto, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/959,756

(22) Filed: Apr. 23, 2018

(65) Prior Publication Data
US 2018/0347502 A1     Dec. 6, 2018

(30) Foreign Application Priority Data

Jun. 6, 2017   (JP) .................................. 2017-111671

(51) Int. Cl.
*F02D 41/40*   (2006.01)
*F02D 13/02*   (2006.01)
(Continued)

(52) U.S. Cl.
CPC ....... *F02D 41/402* (2013.01); *F02D 13/0234* (2013.01); *F02D 13/0238* (2013.01);
(Continued)

(58) Field of Classification Search
CPC ............. F02D 13/0234; F02D 13/0238; F02D 13/0253; F02D 13/0269; F02D 41/40; F02D 2041/389; F02D 2200/0406; F02D 2200/0408; F02D 2200/0614; F02D 2200/0616
(Continued)

(56) References Cited

U.S. PATENT DOCUMENTS

2016/0377013 A1 *  12/2016  Yamashita .......... F02D 13/0269
123/480

FOREIGN PATENT DOCUMENTS

DE     102009016980 A1     6/2010
JP      2010-265817 A      11/2010
(Continued)

OTHER PUBLICATIONS

Oct. 23, 2018 Search Report issued in European Patent Application No. 18175520.8.

*Primary Examiner* — Erick R Solis
(74) *Attorney, Agent, or Firm* — Oliff PLC

(57) ABSTRACT

A controller for an internal combustion engine includes a processing circuit configured to execute a calculating process that calculates a returned air amount and an operating process that operates a fuel injection valve so that an air-fuel ratio of a mixture that is burned in a combustion chamber is controlled to a target value. The operating process includes under a condition in which the returned air amount is increased, having the fuel injection valve inject fuel increased in amount from a constant fuel amount, which is an amount of fuel injected when the returned air amount is unchanged, and under a condition in which the returned air amount is decreased, having the fuel injection valve inject fuel decreased in amount from the constant fuel amount.

8 Claims, 9 Drawing Sheets

(51) Int. Cl.
*F02D 41/30* (2006.01)
*F02D 41/38* (2006.01)
*F02D 41/00* (2006.01)

(52) U.S. Cl.
CPC ..... *F02D 13/0253* (2013.01); *F02D 13/0269* (2013.01); *F02D 41/3064* (2013.01); *F02D 41/3094* (2013.01); *F02D 2041/001* (2013.01); *F02D 2041/389* (2013.01); *F02D 2200/04* (2013.01); *F02D 2200/0406* (2013.01); *F02D 2200/0408* (2013.01); *F02D 2200/0614* (2013.01); *F02D 2200/0616* (2013.01)

(58) Field of Classification Search
USPC ........... 701/104; 123/90.15–90.18, 492, 493, 123/682
See application file for complete search history.

(56) References Cited

FOREIGN PATENT DOCUMENTS

| | | |
|---|---|---|
| JP | 2011-032967 A | 2/2011 |
| JP | 2011-157859 A | 8/2011 |
| JP | 2012-219771 A | 11/2012 |
| JP | 2015-004342 A | 1/2015 |

* cited by examiner

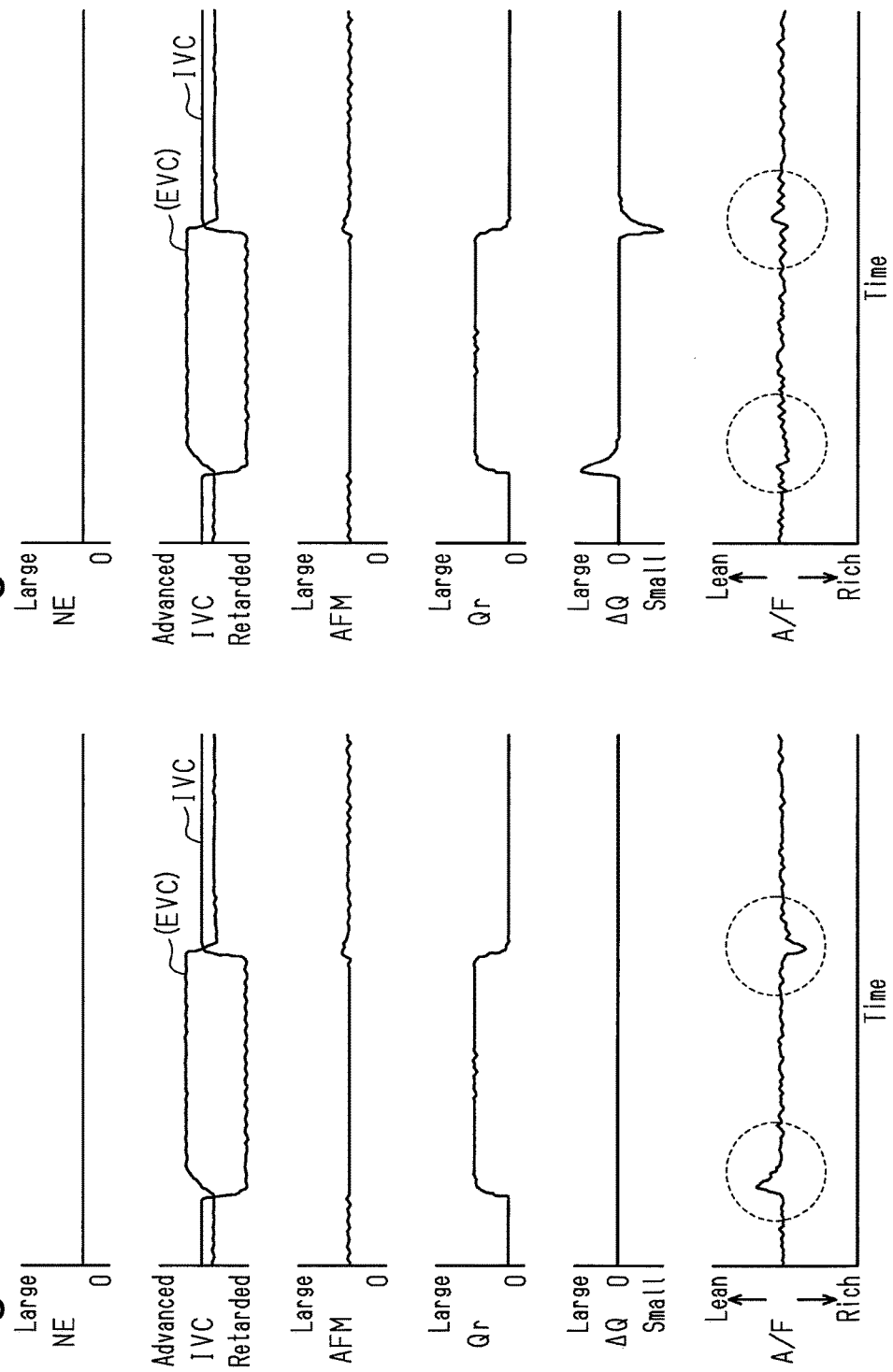

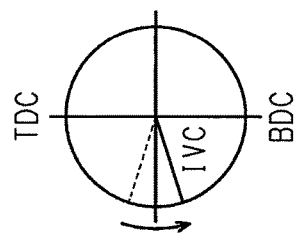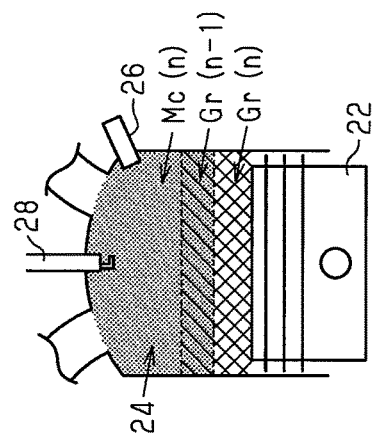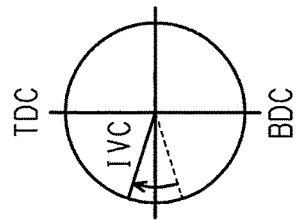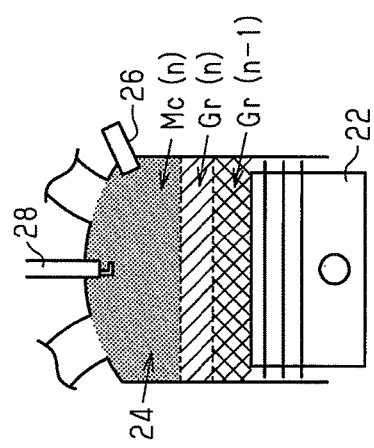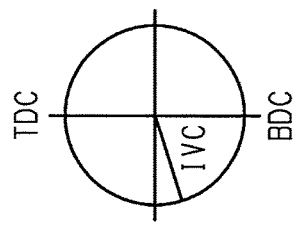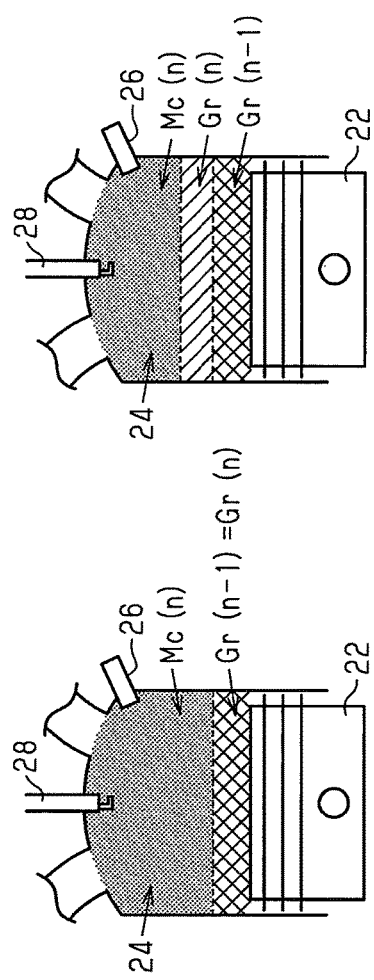

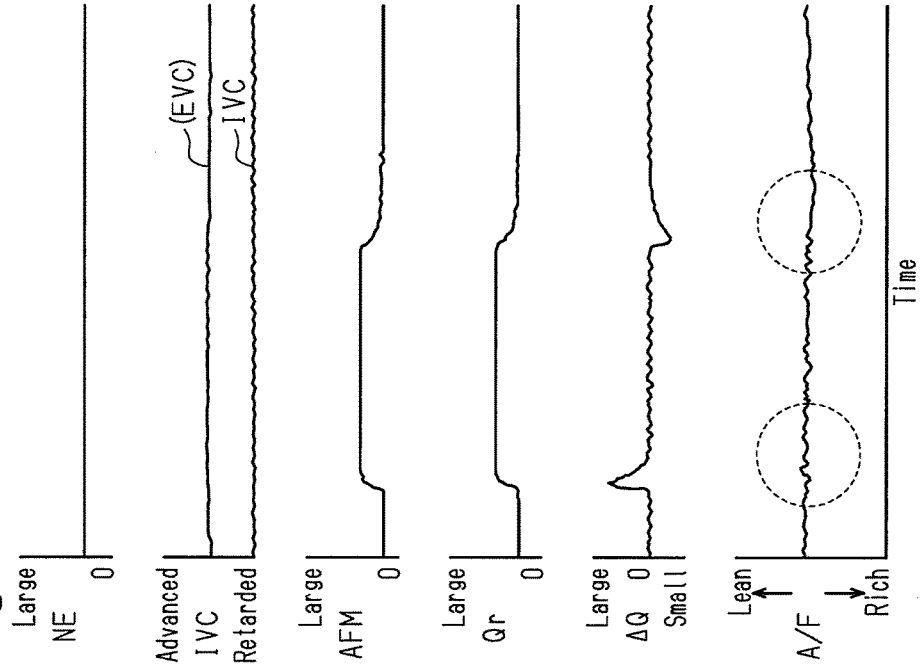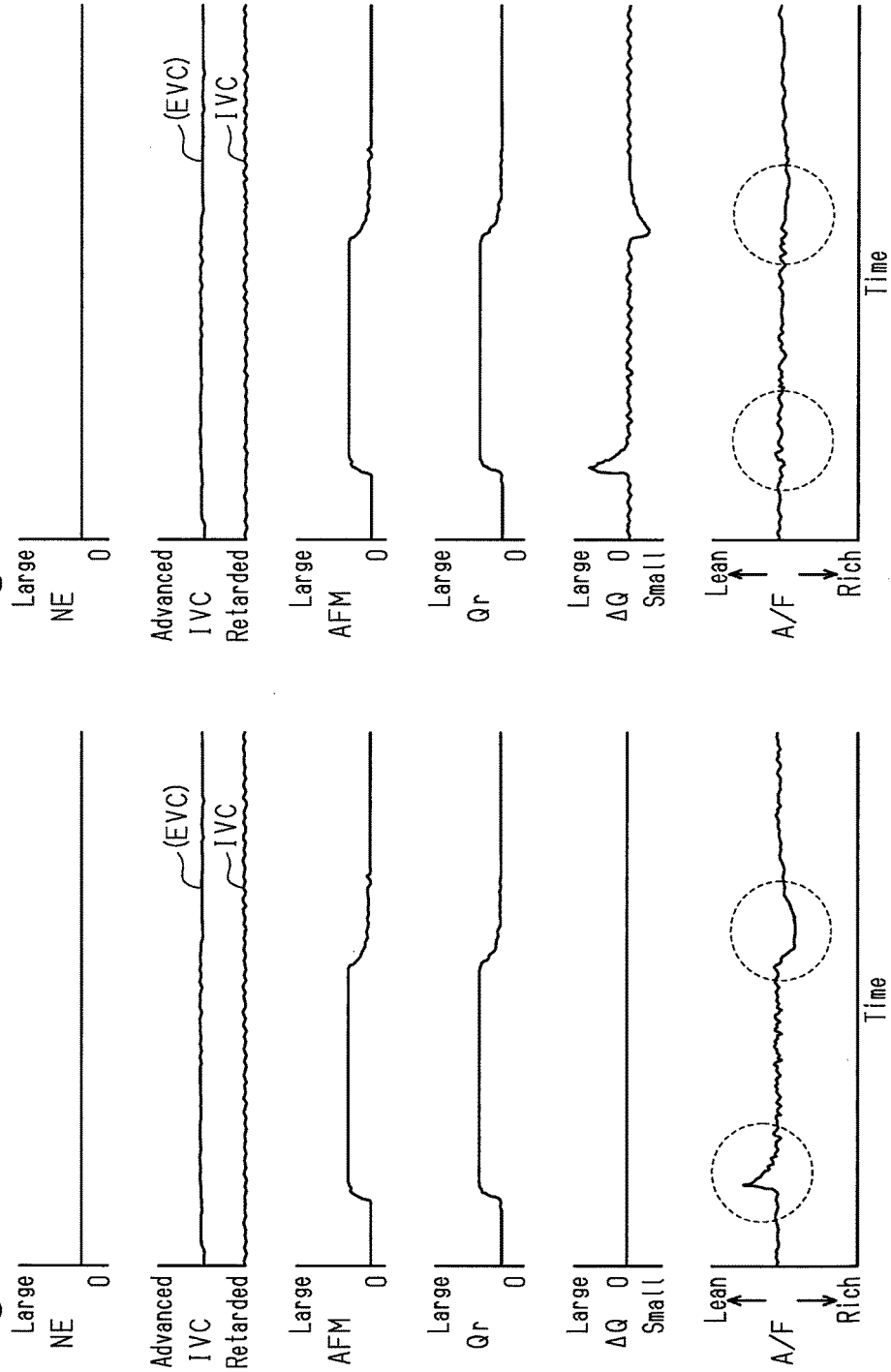

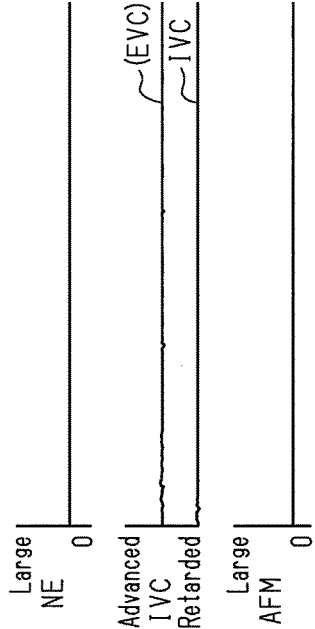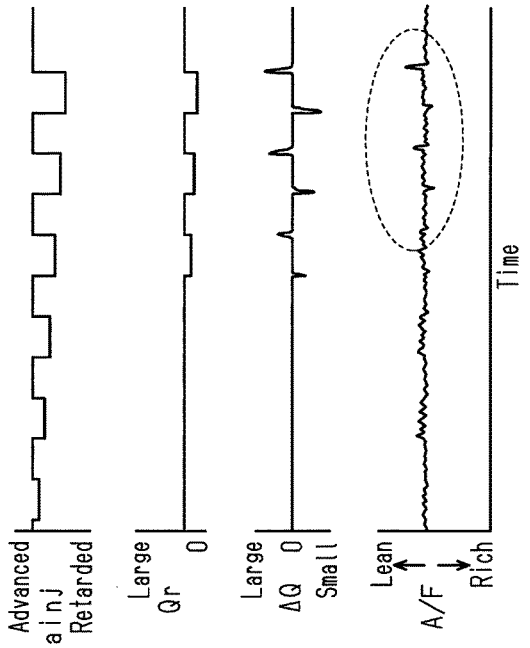
Fig.11A
Fig.11B

CONTROLLER FOR INTERNAL COMBUSTION ENGINE AND METHOD FOR CONTROLLING INTERNAL COMBUSTION ENGINE

BACKGROUND ART

The present invention relates to a controller for an internal combustion engine and a method for controlling an internal combustion engine.

Japanese Laid-Open Patent Publication No. 2010-265817 discloses one example of a controller for an internal combustion engine that variably sets a closing timing of an intake valve. Particularly, paragraph "0038" of the publication describes control that retards the valve closing timing from a timing at which a piston reaches the bottom dead center (hereafter, referred to as "the bottom dead center timing"). The control is performed when the internal combustion engine is in a predetermined running state.

As described above, when the closing timing of an intake valve is retarded from the bottom dead center timing, some of the mixture of air and fuel in the combustion chamber returns to the intake passage before the intake valve closes. In this case, the returned mixture flows into the combustion chamber in the next combustion cycle. In a constant state in which the amount of returned fuel is constant, a fuel amount necessary for controlling the air-fuel ratio in a mixture that is burned in the combustion chamber to a target value corresponds to the amount of air in the mixture. However, in a transition state in which the returned fuel amount changes due to, for example, change in the valve closing timing, if air-fuel ratio control is performed based on the fuel amount corresponding to the air amount described above, the controllability of the air-fuel ratio may be adversely affected.

SUMMARY OF THE INVENTION

Multiple aspects of the present invention will now be described.

1. One aspect of the present invention is a controller for an internal combustion engine. The internal combustion engine includes a fuel injection valve that injects fuel to supply the fuel into a combustion chamber, an intake passage connected to the combustion chamber, and an intake valve that opens and closes the intake passage. The internal combustion engine is configured to allow a closing timing of the intake valve to be retarded from a bottom dead center timing. The controller may include a processing circuit configured to execute a calculating process that calculates a returned air amount, which is an amount of air that flows into the combustion chamber and returns to the intake passage before the intake valve closes, and an operating process that operates the fuel injection valve so that an air-fuel ratio of a mixture that is burned in the combustion chamber is controlled to a target value. The operating process includes under a condition in which the returned air amount is increased, having the fuel injection valve inject fuel increased in amount from a constant fuel amount, which is an amount of fuel injected when the returned air amount is unchanged, and under a condition in which the returned air amount is decreased, having the fuel injection valve inject fuel decreased in amount from the constant fuel amount.

Another aspect of the present invention is a method for controlling an internal combustion engine. The internal combustion engine includes a fuel injection valve that injects fuel to supply the fuel into a combustion chamber, an intake passage connected to the combustion chamber, and an intake valve that opens and closes the intake passage. The internal combustion engine is configured to allow a closing timing of the intake valve to be retarded from a bottom dead center timing. The method may include calculating a returned air amount, which is an amount of air that flows into the combustion chamber and returns to the intake passage before the intake valve closes, and operating the fuel injection valve so that an air-fuel ratio of a mixture that is burned in the combustion chamber is controlled to a target value. The operating the fuel injection valve includes under a condition in which the returned air amount is increased, having the fuel injection valve inject fuel increased in amount from a constant fuel amount, which is an amount of fuel injected when the returned air amount is unchanged, and under a condition in which the returned air amount is decreased, having the fuel injection valve inject fuel decreased in amount from the constant fuel amount.

When some of the mixture returns to the intake passage, the fuel amount in the returned mixture depends on the returned air amount. More specifically, when the returned air amount is increased, the fuel amount also tends to increase in the returned mixture. When the returned air amount is decreased, the fuel amount also tends to decrease in the returned mixture. When the fuel amount is increased in the returned mixture, a fuel amount appropriate for controlling the air-fuel ratio of a mixture that is burned to a target value tends to be larger than a fuel amount necessary for controlling the air-fuel ratio to the target value when the fuel amount is not increased in the returned mixture. Also, when the fuel amount is decreased in the returned mixture, a fuel amount appropriate for controlling the air-fuel ratio of a mixture that is burned to a target value tends to be smaller than a fuel amount necessary for controlling the air-fuel ratio to the target value when the fuel amount is not decreased in the returned mixture. The returned air amount has a strong positive correlation with the fuel amount in the returned mixture. Thus, in the above configuration, a returned air amount is calculated, the fuel amount is increased under a condition in which the calculated returned air amount is increased, and the fuel amount is decreased under a condition in which the calculated returned air amount is decreased. This limits the adverse effect on the controllability of the air-fuel ratio in the transition state, in which the returned fuel amount changes.

2. In the controller for an internal combustion engine according to the first aspect described above, the operating process may include variably setting a fuel amount to be increased from the constant fuel amount and a fuel amount to be decreased from the constant fuel amount in accordance with a fuel injection start timing of the fuel injection valve The fuel amount in the mixture returned to the intake passage may not be uniquely determined in accordance with the returned air amount and may vary in accordance with the fuel injection start timing of the fuel injection valve. In this regard, in the above configuration, the increase amount and decrease amount are variably set in accordance with the fuel injection start timing of the fuel injection valve. Thus, in a case in which the fuel amount in the returned mixture is not uniquely determined in accordance with the returned air amount, the air-fuel ratio of the mixture that is burned is controlled with higher accuracy than when the increase amount and decrease amount are determined from only the returned air amount.

Additionally, in the above configuration, since the returned air amount is calculated, the increase amount and decrease amount are variably set based on the returned air amount and the fuel injection start timing. Thus, in a case in which two or more parameters are used for calculating the returned air amount, the number of parameters calculating the increase amount and decrease amount may be reduced as compared to when the increase amount and decrease amount are variably set based on the injection start timing and the parameters used for calculating the returned air amount without calculating the returned air amount. As a result, the fitting steps are easily reduced.

3. In the controller for an internal combustion engine according to the first or second aspect described above, the operating process may include under a condition in which the returned air amount is increased, having the fuel injection valve inject fuel increased in amount from the constant fuel amount in a combustion cycle in which the returned air amount is increased and following combustion cycles, and under a condition in which the returned air amount is decreased, having the fuel injection valve inject fuel decreased in amount from the constant fuel amount in a combustion cycle in which the returned air amount is decreased and following combustion cycles.

The inventors have found that the transition state, in which the returned air amount changes, may affect combustion cycles subsequent to a combustion cycle in which the change occurred. In this regard, in the above configuration, the fuel amount is increased or decreased in a combustion cycle in which the returned air amount is increased or decreased and also in the following combustion cycles. This copes with a situation in which the transition state affects the following combustion cycles.

4. In the controller for an internal combustion engine according to any one of the first to third aspects described above, the internal combustion engine may include a valve property variable device that variably sets a closing timing of the intake valve. The calculating process includes calculating the returned air amount based on intake pressure and a parameter indicating a valve property of the intake valve determining the closing timing. The calculated returned air amount increases as the closing timing is retarded and also increases as the intake pressure is increased.

When the closing timing of the intake valve changes, the returned air amount has a strong correlation with the closing timing. The returned air amount also has a strong correlation with the intake pressure. Thus, in the above configuration, the returned air amount is calculated based on these parameters.

Additionally, in the above configuration, the returned air amount is calculated based on multiple parameters. Thus, with configuration 2 described above, when the increase amount and decrease amount are determined based on the returned air amount and the injection start timing, the number of parameters determining the increase amount and decrease amount is reduced as compared to when the increase amount and decrease amount are determined based on the injection start timing and multiple parameters calculating the returned air amount. As a result, the fitting steps are easily reduced.

5. In the controller for an internal combustion engine according to any one of the first to fourth aspects described above, the operating process may include calculating a difference obtained by subtracting a fuel amount in a mixture returned to the intake passage before the intake valve closes in a preceding cycle from a fuel amount in a mixture returned to the intake passage before the intake valve closes in a present cycle, operating the fuel injection valve so that when the difference is a positive value, the fuel injection valve injects fuel increased in amount from a fuel amount injected when the difference is zero, and operating the fuel injection valve so that when the difference is a negative value, the fuel injection valve injects fuel decreased in amount from a fuel amount injected when the difference is zero.

In the above configuration, the returned fuel amount of the present combustion cycle is not considered to be a returned fuel amount obtained when the fuel is injected in an amount corresponding to when the returned air amount is unchanged but instead considered to be a returned fuel amount obtained when a larger amount of fuel is assumed to be injected from the fuel injection valve. This limits deviations of the fuel amount in the returned mixture from a value estimated by the excess-shortage calculating process due to the process for increasing or decreasing the fuel amount when the difference is zero.

6. In the controller for an internal combustion engine according to the fifth aspect described above, the operating process may include operating the fuel injection valve to perform multiple fuel injections in one combustion cycle so that an air-fuel ratio of a mixture that is burned in the combustion chamber is controlled to the target value and increasing or decreasing a fuel amount of a first one of the multiple fuel injections from a fuel amount injected when the difference is zero. Additionally, the fuel injection valve may include a direct injection valve that injects fuel into the combustion chamber, and the processing circuit is configured to have the direct injection valve perform a last one of the multiple fuel injections.

The fuel amount returned to the intake passage tends to decrease when the fuel injection start timing of the direct injection valve is retarded as compared to when advanced. Thus, the injection amount of the first fuel injection is increased or decreased to appropriately compensate for excess and shortage in the returned fuel amount calculated by the excess-shortage calculating process.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which:

FIG. 8A is a time chart of a comparative example;

FIG. 8B is a time chart showing effects of the controller shown in FIG. 1;

FIGS. 9A to 9C are diagrams illustrating the problem that is solved by the controller shown in FIG. 1;

FIG. 10A is a time chart of a comparative example;

FIG. 10B is a time chart showing effects of the controller shown in FIG. 1;

FIG. 11A is a time chart of a comparative example; and

FIG. 11B is a time chart showing effects of the controller shown in FIG. 1.

DESCRIPTION OF THE EMBODIMENTS

One embodiment of a controller for an internal combustion engine will now be described with reference to the drawings.

Figure 1:
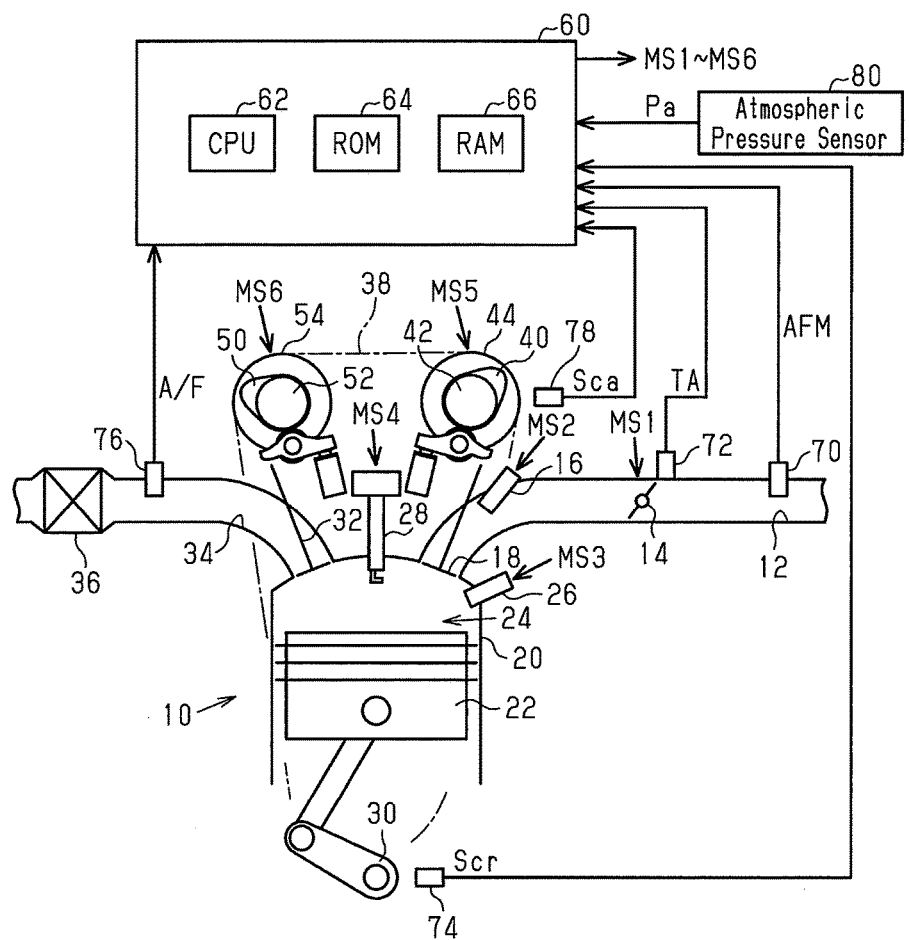
FIG. 1 is a diagram showing one embodiment of an internal combustion engine and a controller for the internal combustion engine.

As shown in FIG. 1, an internal combustion engine 10 includes an intake passage 12 including a throttle valve 14. The intake passage 12 also includes a port injection valve 16 arranged at the downstream side of the throttle valve 14. When an intake valve 18 opens, air drawn in through the throttle valve 14 from the outside and fuel injected from the port injection valve 16 flow into a combustion chamber 24 defined by a cylinder 20 and a piston 22. A direct injection valve 26 and an ignition device 28 are exposed in the combustion chamber 24. The ignition device 28 produces a spark discharge that burns the mixture of the air, which flows in through the throttle valve 14, and the fuel, which is injected from the port injection valve 16 and the direct injection valve 26, in the combustion chamber 24. The combustion energy is converted through the piston 22 into rotation energy of a crankshaft 30. The combustion produces emissions. When an exhaust valve 32 opens, the emissions are discharged to an exhaust passage 34. The exhaust passage 34 includes a catalyst 36 purifying the emissions.

The intake valve 18 is driven by an intake-side cam 40 to open and close. The intake-side cam 40 is driven by rotation of an intake-side camshaft 42 that receives rotation power of the crankshaft 30 via a timing chain 38. More specifically, the intake-side camshaft 42 receives the rotation power from the timing chain 38 via an intake-side variable valve timing device (intake-side VVT 44). The intake-side VVT 44 is an actuator that changes the relative rotation angle of the intake-side camshaft 42 relative to the rotation angle of the crankshaft 30. The exhaust valve 32 is driven by an exhaust-side cam 50. The exhaust-side cam 50 is driven by rotation of an exhaust-side camshaft 52 that receives rotation power of the crankshaft 30 via the timing chain 38. More specifically, the exhaust-side camshaft 52 receives the rotation power from the timing chain 38 via an exhaust-side variable valve timing device (exhaust-side VVT 54). The exhaust-side VVT 54 is an actuator that changes the relative rotation angle of the exhaust-side camshaft 52 relative to the rotation angle of the crankshaft 30.

The internal combustion engine 10 is controlled by a controller 60. More specifically, the controller 60 controls control amounts (e.g., torque, exhaust constituent) of the internal combustion engine 10 by operating various devices that are the subjects of operation such as the throttle valve 14, the port injection valve 16, the direct injection valve 26, the ignition device 28, the intake-side VVT 44, and the exhaust-side VVT 54. When controlling the control amounts, the controller 60 refers to an intake air amount AFM detected by an air flow meter 70, an open degree TA of the throttle valve 14 detected by a throttle sensor 72, an output signal Scr of a crank angle sensor 74, and an air-fuel ratio A/F detected by an air-fuel ratio sensor 76 arranged in the exhaust passage 34. Additionally, the controller 60 refers to an output signal Sca of an intake-side cam angle sensor 78, which detects the rotation angle of the intake-side camshaft 42, and atmospheric pressure Pa detected by an atmospheric pressure sensor 80. The controller 60 includes a CPU 62, a ROM 64, and a RAM 66. The CPU 62 runs programs stored in the ROM 64 so that the controller 60 controls the above control amounts.

Figure 2:
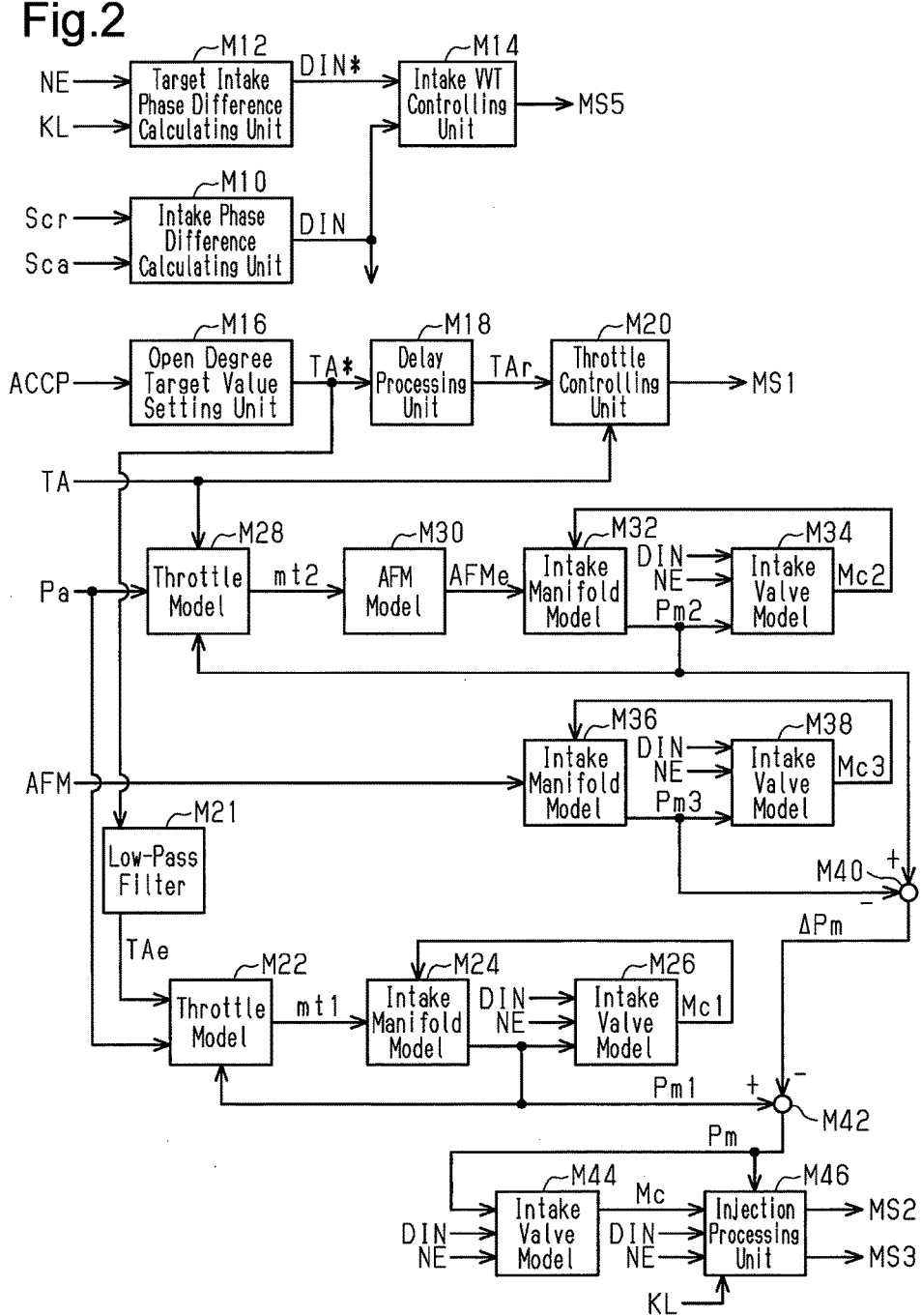
FIG. 2 is a block diagram showing some of the processes executed by the controller shown in FIG. 1.

FIG. 2 shows some of the processes accomplished by the CPU 62 running the programs stored in the ROM 64.

An intake phase difference calculating unit M10 calculates an intake phase difference DIN, which is the phase difference of the rotation angle of the intake-side camshaft 42 from the rotation angle of the crankshaft 30, based on the output signal Scr of the crank angle sensor 74 and the output signal Sca of the intake-side cam angle sensor 78. A target intake phase difference calculating unit M12 variably sets a target intake phase difference DIN* based on an operating point of the internal combustion engine 10. In the present embodiment, the operating point is determined by a rotation speed NE and a load ratio KL. The CPU 62 calculates the rotation speed NE based on the output signal Scr of the crank angle sensor 74 and calculates the load ratio KL based on the intake air amount AFM. The load ratio KL is the ratio of an intake air amount to a reference intake air amount in one combustion cycle of a cylinder. The reference intake air amount is an intake air amount in one combustion cycle of a cylinder when the open degree of the throttle valve 14 is maximal. The reference intake air amount may be variably set in accordance with the rotation speed NE.

An intake VVT controlling unit M14 outputs an operation signal MS5 to operate the intake-side VVT 44 so that the intake phase difference DIN is controlled to the target intake phase difference DIN*.

An open degree target value setting unit M16 sets a target value of the open degree (target open degree TA*) of the throttle valve 14 based on an accelerator operation amount ACCP. More specifically, the open degree target value setting unit M16 sets the target open degree TA*, for example, to a larger value when the accelerator operation amount ACCP is large than when small.

A delay processing unit M18 calculates a delay open degree TAr, which delays the target open degree TA* for a predetermined time. A throttle controlling unit M20 outputs an operation signal MS1 to operate the throttle valve 14 so that the open degree TA detected by the throttle sensor 72 is controlled to the delay open degree TAr.

When the actual open degree TA is assumed to be controlled to the target open degree TA*, the actual open degree TA delays with respect to change in the target open degree TA*. Taking the delay into consideration, a low-pass filter M21 outputs a primary delay processed value of the target open degree TA* as an estimated open degree TAe.

A throttle model M22 calculates a throttle flow rate mt1, which is the amount of air flowing through the throttle valve 14, based on the estimated open degree TAe, the atmospheric pressure Pa, and intake pressure Pm1, which is calculated in a process described later. More specifically, the throttle model M22 calculates that the throttle flow rate mt1 is a larger value when the atmospheric pressure Pa is high than when low. The throttle model M22 also calculates that the throttle flow rate mt1 is a smaller value when the intake pressure Pm1 is high than when low and that the throttle flow rate mt1 is a larger value when the estimated open degree TAe is large than when small. More specifically, the throttle model M22 calculates the throttle flow rate mt1 based on a model expression associating the estimated open degree TAe, the atmospheric pressure Pa, and the intake pressure Pm1, as input parameters, with the throttle flow rate mt1, as an output parameter. The model expression is not limited to an expression directly connecting the above input parameters to the output parameter. For example, the expression may have a coefficient that is variably set by an input parameter.

An intake manifold model M24 calculates the intake pressure Pm1 based on the throttle flow rate mt1 and a closed-valve intake air amount Mc1, which is calculated by a process described later. The closed-valve intake air amount Mc1 is a value obtained by subtracting the amount of air returned to the intake passage 12 before the intake valve 18 closed from the amount of air that entered the combustion chamber 24 in one combustion cycle. More specifically, the intake manifold model M24 calculates the intake pressure Pm1 so that the increase speed of the intake pressure Pm1 is higher when a value obtained by subtracting the closed-valve intake air amount Mc1 from the throttle flow rate mt1 is large than when small.

An intake valve model M26 calculates the closed-valve intake air amount Mc1 based on the intake pressure Pm1, the intake phase difference DIN, and the rotation speed NE. The intake valve model M26 calculates that the closed-valve intake air amount Mc1 is a larger value when the intake pressure Pm1 is high than when low. Additionally, when the intake phase difference DIN retards the timing for closing the intake valve 18 (intake valve closing timing IVC) from a BDC timing (bottom dead center timing), the intake valve model M26 calculates that the closed-valve intake air amount Mc1 is a smaller value as the retardation amount is increased. The BDC timing is the timing at which the piston 22 reaches the bottom dead center.

A throttle model M28 uses the open degree TA, the atmospheric pressure Pa, and intake pressure Pm2, which is calculated by a process described below, as input parameters and calculates a throttle flow rate mt2 as an output parameter based on the input parameters. Although the throttle model M28 differs from the throttle model M22 in input parameters, the throttle model M28 executes a process for calculating an output parameter based on input parameters in the same manner as the throttle model M22.

Taking into consideration a delay of change in the intake air amount AFM with respect to change in the throttle flow rate mt2, an AFM model M30 calculates an estimated value AFMe of the intake air amount AFM based on the throttle flow rate mt2. The reason why change in the intake air amount AFM delays with respect to change in the throttle flow rate mt2 is that the intake air amount AFM is an average value of an intake air amount in a predetermined period (e.g., one intake process period).

An intake manifold model M32 uses a closed-valve intake air amount Mc2, which is calculated by a process described later, and the estimated value AFMe as input parameters and calculates the intake pressure Pm2 as an output parameter based on the input parameters. Although the intake manifold model M32 differs from the intake manifold model M24 in input parameters, the intake manifold model M32 executes a process for calculating an output parameter based on input parameters in the same manner as the intake manifold model M24.

An intake valve model M34 uses the intake pressure Pm2, the intake phase difference DIN, and the rotation speed NE as input parameters and calculates the closed-valve intake air amount Mc2 as an output parameter based on the input parameters. Although the intake valve model M34 differs from the intake valve model M26 in input parameters, the intake valve model M34 executes a process for calculating an output parameter based on input parameters in the same manner as the intake valve model M26.

An intake manifold model M36 uses a closed-valve intake air amount Mc3, which is calculated by a process described later, and the intake air amount AFM as input parameters and calculates intake pressure Pm3 as an output parameter based on the input parameters. Although the intake manifold model M36 differs from the intake manifold model M24 in input parameters, the intake manifold model M36 executes a process for calculating an output parameter based on input parameters in the same manner as the intake manifold model M24.

An intake valve model M38 uses the intake pressure Pm3, the intake phase difference DIN, and the rotation speed NE as input parameters and calculates the closed-valve intake air amount Mc3 as an output parameter based on the input parameters. Although the intake valve model M38 differs from the intake valve model M26 in input parameters, the intake valve model M38 executes a process for calculating an output parameter based on input parameters in the same manner as the intake valve model M26.

A deviation calculating unit M40 calculates a value (correction amount $\Delta Pm$) obtained by subtracting the intake pressure Pm3 from the intake pressure Pm2. A correction processing unit M42 calculates intake pressure Pm by subtracting the correction amount $\Delta Pm$ from the intake pressure Pm1. In a constant state, the intake pressure Pm is the same as the intake pressure Pm3. In a transition state, the intake pressure Pm is a value weighting the responsiveness of the intake pressure Pm1. More specifically, since the intake pressure Pm2 is calculated based on the estimated value AFMe, in the constant state, the correction amount $\Delta Pm$ compensates for an error of the throttle flow rate mt1 with respect to the intake air amount AFM. In the transition state, the responsiveness of the intake pressure Pm2 is proximate to the responsiveness of the intake pressure Pm3. Thus, in the transition state, the correction amount $\Delta Pm$ does not compensate for the difference between the intake pressure Pm1 and the intake pressure Pm3 and clearly shows change of the intake pressure Pm1 in the intake pressure Pm.

An intake valve model M44 uses the intake pressure Pm, the intake phase difference DIN, and the rotation speed NE as input parameters and calculates a closed-valve intake air amount Mc as an output parameter based on the input parameters. Although the intake valve model M44 differs from the intake valve model M26 in input parameters, the intake valve model M44 executes a process for calculating an output parameter based on input parameters in the same manner as the intake valve model M26.

The closed-valve intake air amount Mc is an estimated value of an amount of air drawn into the combustion chamber 24 in a predetermined period of future time. This is because while the throttle valve 14 is controlled to the delay open degree TAr, the closed-valve intake air amount Mc is a value corresponding to the actual open degree of the throttle valve 14 estimated from the target open degree TA*.

An injection processing unit M46 obtains the closed-valve intake air amount Mc, the intake phase difference DIN, the rotation speed NE, and the intake pressure Pm to operate the port injection valve 16 and the direct injection valve 26. The injection processing unit M46 executes fuel injection control by appropriately dividing the fuel amount between the port injection valve 16 and the direct injection valve 26 so that the air-fuel ratio of the mixture burned in the combustion chamber 24 is controlled to a target value (e.g., stoichiometric ratio) in accordance with the operating point of the internal combustion engine 10.

Figure 3:
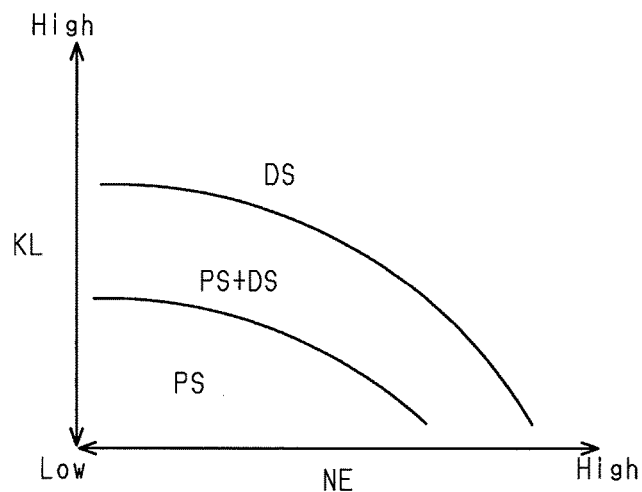
FIG. 3 is a chart showing the setting of fuel injection modes in the internal combustion engine shown in FIG. 1.

FIG. 3 shows the setting of fuel injection modes according to the present embodiment. As shown in FIG. 3, in the present embodiment, in the region where the load ratio KL is less than or equal to a first predetermined value, only port injection (indicated by PS in FIG. 3) is performed in which fuel injection is performed by the port injection valve 16. In the region where the load ratio KL is greater than or equal to a second predetermined value, which is greater than the first predetermined value, only direct injection (indicated by DS in FIG. 3) is performed in which fuel injection is performed by the direct injection valve 26. The first predetermined value and the second predetermined value are set to be smaller values as the rotation speed NE is increased. In the region where the load ratio KL is greater than the first predetermined value and less than the second predetermined value, both the port injection and the direct injection are performed.

In the present embodiment, the port injection is performed before the intake valve 18 opens. This aims to increase the mixing degree of the fuel and air in the mixture in the combustion chamber 24. The setting of fuel injection modes is optimized in view of the port injection having a merit easily increasing the mixing degree of the air-fuel mixture and the direct injection having a merit easily increasing the charging efficiency by improving the cooling effect in the combustion chamber 24 due to evaporation latent heat.

Figure 4A:
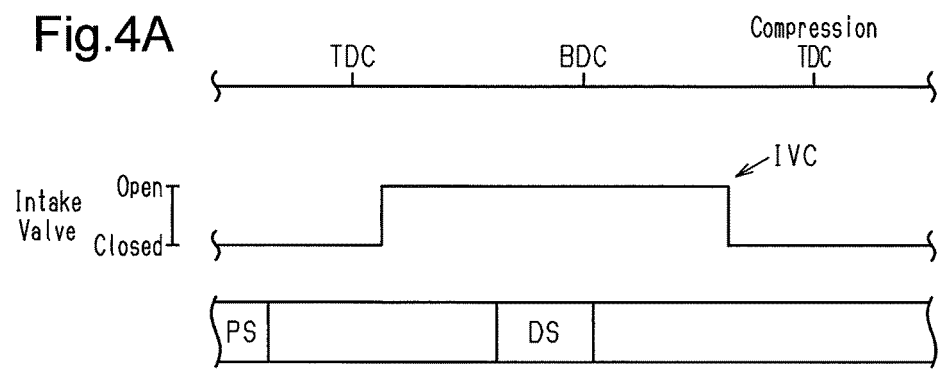
FIGS. 4A and 4B are time charts showing examples of fuel injection in the internal combustion engine shown in FIG. 1.
Figure 4B:
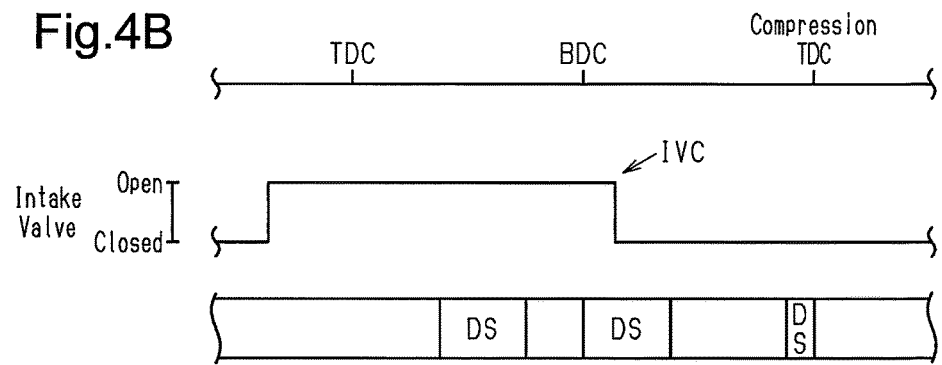

FIG. 4A shows an example in which the port injection and the direct injection are each performed one time. FIG. 4B shows an example in which the direct injection is performed three times. In the present embodiment, fuel injection is performed on a cylinder at most three times in one combustion cycle. The number of injections and an injection start timing ainj are variably set based on the operating point of the internal combustion engine 10. Additionally, as shown in FIGS. 4A and 4B, in the present embodiment, the CPU 62 retards the intake valve closing timing IVC from the BDC timing, and the retardation amount is variably set to a large extent. This setting maximizes the open degree of the throttle valve 14 to reduce pumping losses particularly in the region where the load ratio KL is small.

Figure 5:
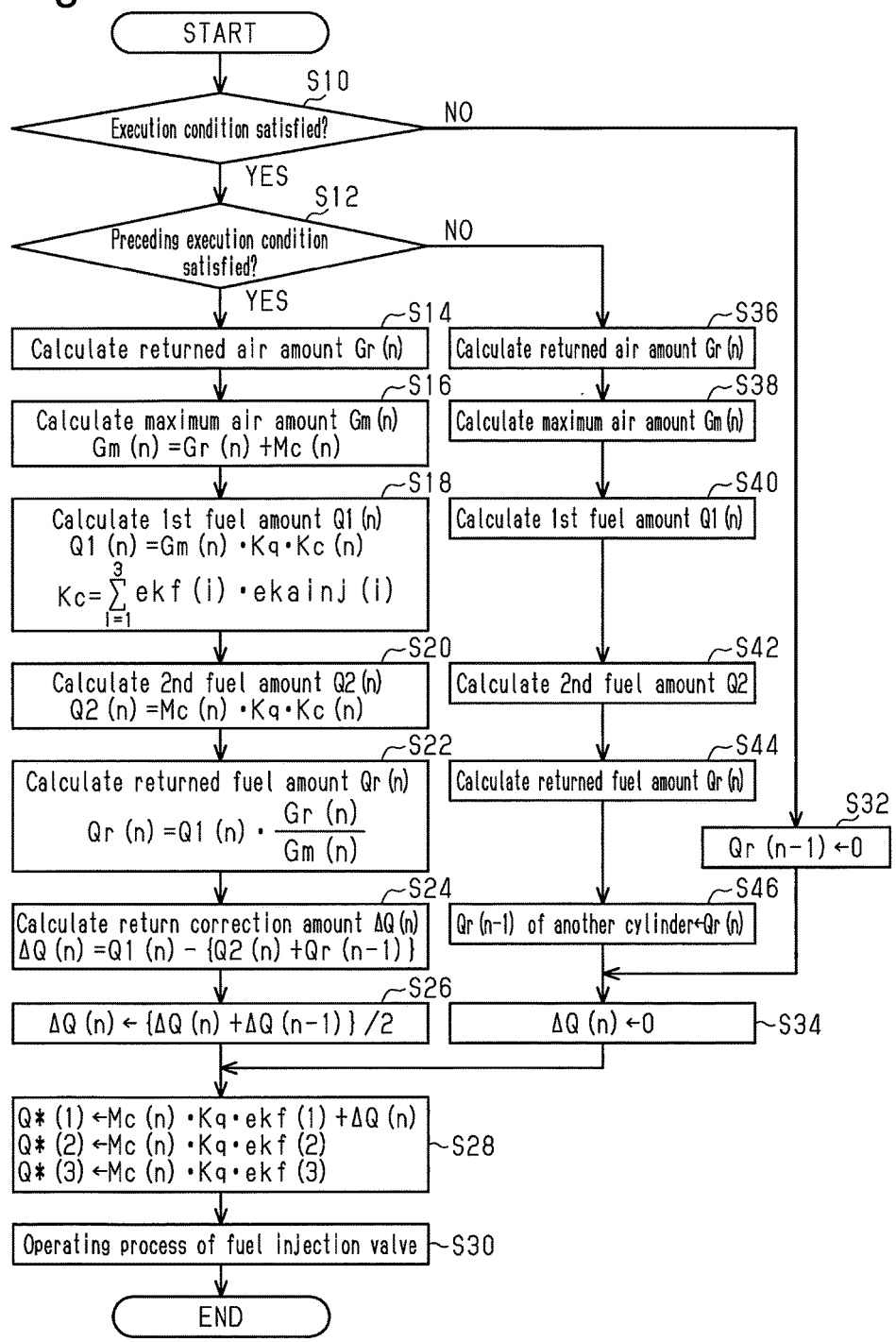
FIG. 5 is a flowchart showing the procedures of a process executed by an injection processing unit of the controller shown in FIG. 1.

FIG. 5 shows the procedures of fuel injection control executed by the injection processing unit M46. The processes shown in FIG. 5 are accomplished when the CPU 62 executes programs stored in the ROM 64. The processes shown in FIG. 5 are performed on each cylinder of the internal combustion engine 10 one time in one combustion cycle before fuel injection is started. In the description hereafter, numerals starting with "S" represent step numbers.

In the series of processes shown in FIG. 5, the CPU 62 first determines whether or not a condition for executing a correction process of an injection amount with a return correction amount $\Delta Q$, which will be described later, is satisfied (S10). The execution condition is satisfied when a condition (con1) such that the rotation speed NE is less than or equal to a predetermined speed is true and a condition (con2) such that fuel injection is performed is true. The condition (con1) is provided because the amount of air returned to the intake passage 12 before the intake valve 18 closes is reduced when the rotation speed NE is high as compared to when low due to the retardation of the intake valve closing timing IVC from the BDC timing. Also, the condition (con1) is provided for the aim of reducing calculation loads. When the CPU 62 determines that the execution condition is satisfied (S10: YES), the CPU 62 determines whether or not the preceding execution condition is satisfied, that is, whether or not the execution condition is satisfied in the process of FIG. 1 performed on the cylinder reaching the compression top dead center immediately before in sequence (S12). When the CPU 62 determines that the preceding execution condition is satisfied (S12: YES), the CPU 62 calculates a returned air amount Gr(n), which is the amount of air that temporarily flows into the combustion chamber 24 when the intake valve 18 is open and then returns to the intake passage 12 before the intake valve closing timing IVC (S14). The variable "n" indicates the value of the newest combustion cycle during the execution of the series of processes shown in FIG. 5. For example, the variable "n−1" indicates the value of the preceding combustion cycle.

The CPU 62 calculates the returned air amount Gr(n) based on the intake valve closing timing IVC of the intake valve 18, the rotation speed NE, and the intake pressure Pm. More specifically, the CPU 62 performs a map calculation using map data that is stored in the ROM 64 in advance to specify the relationship between the intake valve closing timing IVC, the rotation speed NE, and the intake pressure Pm, as input parameters, and the returned air amount Gr, as an output parameter. The map data refers to a data set of discrete values of input variables and values of output variables each corresponding to a value of the input variables. For example, when the value of an input variable matches one of the values of the input variables in the map data, the map calculation may use the value of the corresponding output variable of the map data as the calculation result. When the value of the input variable does not match any of the values of the input variables in the map data, the map calculation may use a value obtained by interpolation of multiple values of the output variables included in the map data as the calculation result.

Figure 6:
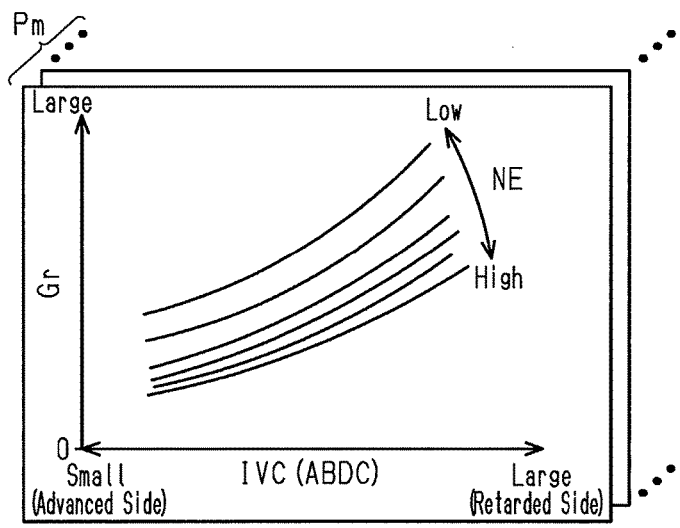
FIG. 6 is a chart showing map data determining a returned air amount.

FIG. 6 schematically shows the tendency indicated by the map data. As shown in FIG. 6, the returned air amount Gr increases as the intake valve closing timing IVC is retarded. The returned air amount Gr also increases as the rotation speed NE is reduced. Further, the returned air amount Gr increases as the intake pressure Pm is increased. The intake pressure Pm, which is input in the process of S14, is a value obtained at a timing proximate to when the intake valve 18 of the subject cylinder closes. This value is obtained because the processes shown in FIG. 2 calculate the intake pressure Pm as a value corresponding to a predetermined later period. The intake valve closing timing IVC is uniquely determined by the intake phase difference DIN. The CPU 62 calculates the intake valve closing timing IVC based on the intake phase difference DIN.

Referring to FIG. 5, the CPU 62 uses expression (c1) described below to calculate a maximum air amount Gm(n), which is the maximum value of the amount of air flowing into the combustion chamber 24 in one combustion cycle (S16).

$$Gm(n)=Gr(n)+Mc(n) \qquad (c1)$$

A closed-valve intake air amount Mc(n) is an estimated value of the air amount remaining in the combustion chamber 24 when the intake valve 18 of the cylinder is closed. This is obtained by the processes shown in FIG. 2, which calculate the closed-valve intake air amount Mc(n) as the value corresponding to the predetermined later period.

The CPU 62 calculates a first fuel amount Q1 based on the maximum air amount Gm(n) using expression (c2) described below (S18).

$$Q1(n)=Gm(n) \cdot Kq \cdot Kc(n) \qquad (c2)$$

Here, a conversion coefficient Kq is a value that is multiplied by an air amount to convert the air amount into a fuel amount needed so that the air-fuel ratio of a mixture containing air of the air amount and fuel reaches a target air-fuel ratio. A correction coefficient Kc is calculated by obtaining a product of an injection rate ekf(i) of fuel injected into a cylinder in one combustion cycle and an injection timing correction coefficient ekainj(i), which is a correction coefficient corresponding to the injection start timing ainj of the corresponding fuel injection, where i=1 to 3, and adding the products. For example, when the port injection is performed only one time in one combustion cycle, the first injection rate ekf(1) is one, and the second and third injection rates ekf(2) and ekf(3) are zero. As shown in the example of FIG. 4B, when the direct injection is performed three times in one combustion cycle, the first injection rate ekf(1), the second injection rate ekf(2), and the third injection rate ekf(3) each have a value that is greater than zero and less than one in correspondence with the rate of the corresponding injection. The injection timing correction coefficient ekainj(i) will be described in the process of S24.

The CPU 62 calculates a second fuel amount Q2($n$) based on the closed-valve intake air amount Mc(n) using expression (c3) described below (S20).

$$Q2(n) = Mc(n) \cdot Kq \cdot Kc(n) \quad (c3)$$

The CPU 62 calculates a returned fuel amount Qr(n) using expression (c4) described below (S22).

$$Qr(n) = Q1(n) \cdot \{Gr(n)/Gm(n)\} \quad (c4)$$

The CPU 62 calculates the return correction amount ΔQ using expression (c5) described below (S24).

$$\Delta Q(n) = Q1(n) - \{Q2(n) + Qr(n-1)\} \quad (c5)$$

The return correction amount ΔQ is a correction amount reducing excess and shortage that would occur due to the returning action when fuel of "Mc(n)·Kq" is injected so that the air-fuel ratio of a mixture of the closed-valve intake air amount Mc(n) of air and fuel reaches the target value. The technical meaning of using the return correction amount ΔQ to correct the fuel amount of "Mc(n)·Kq," which is the amount of fuel corresponding to the closed-valve intake air amount Mc(n), that is, the amount of air in a mixture that is burned, will now be described in detail.

The present embodiment focuses on a situation in which under a predetermined condition, by controlling a mixture of the maximum air amount Gm(n) of air and fuel to a target value, the air-fuel ratio of the mixture burned in the combustion chamber 24 can reach the target value even when some of the mixture in the combustion chamber 24 returns to the intake passage 12 before the intake valve closing timing IVC. The simplest example related to the focus point is when all of the fuel is injected at once from the port injection valve 16 before the intake valve 18 opens, and the air and fuel are considered to be homogenized in the mixture drawn into the combustion chamber 24. In this case, if the port injection valve 16 injects fuel so that the air-fuel ratio of a mixture temporarily flowing into the combustion chamber 24 reaches the target value, the air-fuel ratio of the mixture in the combustion chamber 24 is the target value even when some of the mixture returns from the combustion chamber 24 before the intake valve closing timing IVC. In this case, the excess or shortage of the fuel amount of "Mc(n)·Kq" in order for the mixture of the closed-valve intake air amount Mc(n) of air and fuel to reach the target value may be corrected by the return correction amount ΔQ(n) where the correction coefficient Kc is one. More specifically, in this case, the expression (c2) calculates that the first fuel amount Q1(n) is "Gm(n)·Kq," and the expression (c3) calculates that the second fuel amount Q2(n) is "Mc(n)·Kq." Thus, when a returned fuel amount Qr(n−1) is zero, the expression (c5) calculates that the return correction amount ΔQ is "Q1(n)−Q2(n)." This may be an insufficient amount with respect to fuel necessary for controlling the mixture of the maximum air amount Gm(n) of air and fuel to the target value depending on "Mc(n)·Kq." When considered that the fuel amount in the mixture returned to the intake passage 12 in the preceding combustion cycle flows into the combustion chamber 24 in the present combustion cycle, the value calculated in the expression (c5) is the correction amount needed to provide the combustion chamber 24 with fuel necessary for controlling the mixture of the maximum air amount Gm(n) of air and fuel to the target value.

However, as described above, in the present embodiment, the fuel may be injected into a cylinder multiple times in one combustion cycle. Further, in such a case, as shown in the example of FIG. 4B, fuel may be injected after the intake valve closing timing IVC. In this case, the fuel injected after the intake valve closing timing IVC has no relation to the returning action. Thus, all of the multiple fuel injections do not have to be performed so that the combustion chamber 24 is provided with fuel necessary for controlling the mixture of the maximum air amount Gm(n) of air and fuel to the target value. Instead, the same process as that for controlling the mixture of the maximum air amount Gm(n) of air and fuel to the target value only needs to be performed before the intake valve closing timing IVC.

This concept will now be described using an imaginary case in which the port injection is performed one time before the intake valve 18 opens, and the direct injection is performed one time after the intake valve closing timing IVC. In this case, the injection rate ekf(1) of the port injection, which is the first injection, and the injection rate ekf(2) of the direct injection, which is the second injection, are not zero. The third injection rate ekf(3) is zero. Here, the description will first neglect the preceding returned fuel amount Qr(n−1). In this case, to perform fuel injection so that the combustion chamber 24 is provided with fuel necessary for controlling the mixture of the maximum air amount Gm(n) of air and fuel to the target value, the fuel of "Gm(n)·Kq·ekf(1)" is injected as the first injection, and the fuel of "Gm(n)·Kq·ekf(2)" is injected as the second injection. At the intake valve closing timing IVC after the first fuel injection is performed, the air amount in the combustion chamber 24 is the closed-valve intake air amount Mc(n). When the fuel amount of "Gm(n)·Kq·ekf(1)" and the maximum air amount Gm(n) of air are considered to be uniformly mixed, in the injected fuel amount of "Gm(n)·Kq·ekf(1)," the rate of fuel remaining in the combustion chamber 24 at the intake valve closing timing IVC is "Mc(n)/Gm(n)." Thus, to control the air-fuel ratio of a mixture that is burned to the target value, the amount of fuel remaining in the combustion chamber 24 at the intake valve closing timing IVC is "Mc(n)·Kq·ekf(1)." Therefore, in the second fuel injection, only fuel of "Mc(2)·Kq·ekf(2)" needs to be injected.

When the fuel amount of "Gm(n)·Kq·ekf(1)" and the maximum air amount Gm(n) of air are considered to be uniformly mixed, the returned fuel amount Qr(n) is "Gr(n)/Gm(n)" times greater than "Gm(n)·Kq·ekf(1)," that is, "{Gm(n)·Kq·ekf(1)}·Gr(n)/Gm(n)." Here, information related to the second injection amount is not used. This can be expressed when the injection timing correction coefficient ekainj used in the process of S18 is set to one for the port injection and zero for the direct injection performed after the intake valve closing timing IVC.

As indicated by the second fuel injection in the example of FIG. 4B, a case in which fuel injection is performed after the BDC timing when the intake valve 18 is open will now be described. In this case, if the rate of the injected fuel contributing to the returned fuel amount Qr is set to "Gr(n)/Gm(n)," the accuracy may be lowered. This is because the retardation of the injection timing limits the returning to the intake passage 12. Such an action is expressed by setting the value of the injection timing correction coefficient ekainj used in the process of S18 to be greater than zero and less than one. In this case, the injection timing correction coefficient ekainj does not exactly determine the rate of the injected fuel contributing to the returned fuel amount Qr but is adapted to a value allowing the return correction amount ΔQ to control the air-fuel ratio with high accuracy. More specifically, in this case, even if the mixture of the maximum air amount Gm(n) of air and fuel is controlled to the target value, the above condition, in which the air-fuel ratio of the mixture that is burned in the combustion chamber 24 reaches the target value, cannot exactly be satisfied when some of the mixture in the combustion chamber 24 returns to the intake passage 12 before the intake valve closing timing IVC.

In the present embodiment, the CPU 62 calculates the injection timing correction coefficient ekainj of the direct injection based on the injection start timing ainj, the intake valve closing timing IVC, and the rotation speed NE. More specifically, the ROM 64 stores map data specifying the relationship between the injection start timing ainj, the intake valve closing timing IVC, and the rotation speed NE, as input parameters, and the injection timing correction coefficient ekainj, as an output parameter. The CPU 62 calculates the injection timing correction coefficient ekainj based on the map data.

Figure 7:
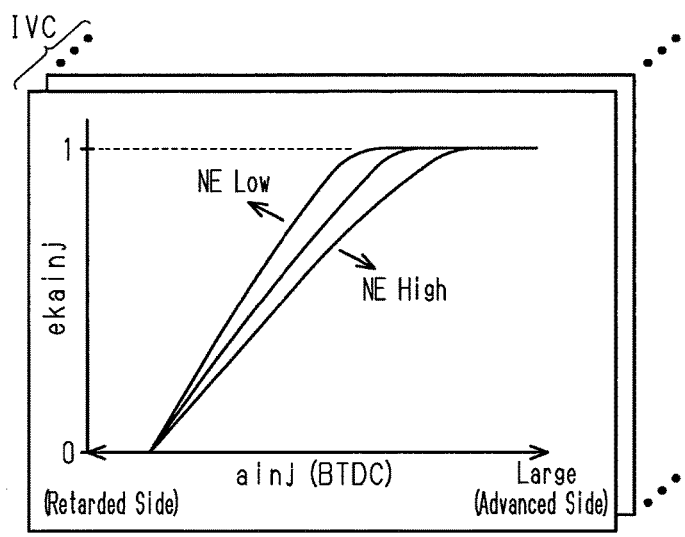
FIG. 7 is a chart showing map data determining an injection timing correction coefficient.

FIG. 7 schematically shows the tendency of the map data of the present embodiment. As shown in FIG. 7, the injection timing correction coefficient ekainj is one when the injection start timing ainj is advanced by a predetermined amount or more, becomes smaller as the injection start timing ainj is retarded, and is zero when the injection start timing ainj is retarded from a certain value. Also, the injection timing correction coefficient ekainj becomes larger as the rotation speed NE is reduced.

According to the expressions (c1) to (c4), the expression (c5) may be reformed into expression (c6) described below.

$$\Delta Q(n) = Gm(n) \cdot Kq \cdot Kc(n) - Mc(n) \cdot Kq \cdot Kc(n) - Qr(n-1) \quad (c6)$$
$$= Gr(n) \cdot Kq \cdot Kc(n) - Qr(n-1)$$
$$= Gm(n) \cdot Kq \cdot Kc(n) \cdot Gr(n)/Gm(n) - Qr(n-1)$$
$$= Qr(n) - Qr(n-1)$$

According to the expression (c6), under the above predetermined condition, when the combustion chamber 24 is provided with fuel necessary for controlling the mixture of the maximum air amount Gm(n) of air and fuel to the target value, the return correction amount ΔQ is a change amount of fuel in the mixture returned to the intake passage 12.

Referring to FIG. 5, when the process of S24 is completed, the CPU 62 calculates a value obtained by performing an exponential moving average on the return correction amount ΔQ(n), which is calculated in the present process of S24, and the preceding return correction amount ΔQ(n−1) as the final return correction amount ΔQ(n) (S26). More specifically, one-half of the sum of the return correction amount ΔQ(n), which is calculated in the present process of S24, and the preceding return correction amount ΔQ(n−1) is used as the exponential moving average value. This is based on a presumption that in the constant state, the returned fuel amount Qr(n) satisfying the expression (c4) entirely flows into the combustion chamber 24 in the next combustion cycle, and in the transition state, for example, changes in the returned air amount Gr cause changes in the returned fuel amount Qr to remain in subsequent cycles.

The CPU 62 calculates a first injection amount instruction value Q*(1), a second injection amount instruction value Q*(2), and a third injection amount instruction value Q*(3) (S28). The CPU 62 calculates the second injection amount instruction value Q*(2) and the third injection amount instruction value Q*(3) based on "Mc(n)·Kq·ekf(j), where j=2, 3." The CPU 62 calculates the first injection amount instruction value Q*(1) based on "Mc(n)·Kq·ekf(1)+ΔQ(n)." The return correction amount ΔQ(n) is used to calculate the first injection amount instruction value Q*(1) because the return correction amount ΔQ(n) corresponds to the shortage amount when the mixture of the maximum air amount Gm(n) of air and fuel is controlled to the target value only before the intake valve closing timing IVC.

The CPU 62 operates the corresponding one of the port injection valve 16 and the direct injection valve 26 based on the injection amount instruction values Q*(1), Q*(2), and Q*(3) (S30).

When the negative determination is made in S10, the CPU 62 sets the returned fuel amount Qr(n−1) to zero (S32). The CPU 62 sets the return correction amount ΔQ(n) to zero (S34) and proceeds to the process of S28.

When the negative determination is made in S12, the CPU 62 executes the processes of S36 to S44 in correspondence with the processes of S14 to S22. The CPU 62 assigns the value calculated in the process of S44 to the returned fuel amount Qr(n−1) of the preceding combustion cycle of a cylinder that differs from the cylinder on which the present process is performed (S46). This process considers the value calculated in the process of S44 as the preceding returned fuel amount Qr(n−1) of another cylinder. At the point in time when the process of S44 is executed, the returned fuel amount Qr(n) is not calculated for any cylinder. Thus, the return correction amount ΔQ(n) cannot be used until the next combustion cycle. When the process of S46 is executed, the return correction amount ΔQ(n) cannot be used only for the first one of the cylinders satisfying the execution condition. However, the return correction amount ΔQ(n) may be used for the following ones of the cylinders.

When the process of S46 is completed, the CPU 62 sets the return correction amount ΔQ(n) to zero (S34) and proceeds to the process of S28. When the process of S30 is completed, the CPU 62 temporarily ends the series of processes shown in FIG. 5. When the series of processes shown in FIG. 5 temporarily ends, the parameters provided with variable n become parameters provided with variable n−1.

The operation of the present embodiment will now be described.

FIG. 8A shows the rotation speed NE, the intake valve closing timing IVC, the intake air amount AFM, the returned fuel amount Qr, the return correction amount ΔQ, and the air-fuel ratio A/F of a comparative example that does not perform a correction with the return correction amount ΔQ. FIG. 8B shows the rotation speed NE, the intake valve closing timing IVC, the intake air amount AFM, the returned fuel amount Qr, the return correction amount ΔQ, and the air-fuel ratio A/F of the present embodiment. FIGS. 8A and 8B also show an exhaust valve closing timing EVC. As shown in FIG. 8A, in the comparative example, changes in the intake valve closing timing IVC cause large variations of the air-fuel ratio A/F. However, as shown in FIG. 8B, the present embodiment limits variations of the air-fuel ratio A/F caused by changes in the intake valve closing timing IVC. In FIGS. 8A and 8B, it is assumed that the changes in the intake valve closing timing IVC hardly cause any change in injection mode. In other words, changes in the injection timing correction coefficient ekainj are negligible.

The reason why changes in the intake valve closing timing IVC cause large variations of the air-fuel ratio A/F in the comparative example will now be described with reference to FIGS. 9A to 9C. In FIGS. 9A to 9C, the piston 22 is located at the bottom dead center.

FIG. 9A shows a constant state in which the intake valve closing timing IVC is unchanged. In this case, the preceding returned air amount Gr(n−1) is the same as the present returned air amount Gr(n). If the fuel injection mode also is unchanged, when the returned air amount Gr is unchanged, the returned fuel amount also is unchanged. Thus, the air-fuel ratio is controlled to the target value simply by injecting the fuel amount "Mc(n)·Fq" of fuel corresponding to the closed-valve intake air amount Mc(n) without using the return correction amount ΔQ.

FIG. 9B shows that a retardation of the intake valve closing timing IVC results in an increase of the present returned air amount Gr(n) from the preceding returned air amount Gr(n−1). In this case, since the present returned fuel amount Qr(n) is increased from the preceding returned fuel amount Qr(n−1), the air-fuel ratio of the mixture that is burned will be lean when simply the fuel amount "Mc(n)·Fq" of fuel corresponding to the closed-valve intake air amount Mc(n) is injected.

FIG. 9C shows that an advancement of the intake valve closing timing IVC results in a decrease of the present returned air amount Gr(n) from the preceding returned air amount Gr(n−1). In this case, since the present returned fuel amount Qr(n) is decreased from the preceding returned fuel amount Qr(n−1), the air-fuel ratio of the mixture that is burned will be rich when the fuel amount "Mc(n)·Fq" of fuel corresponding to the closed-valve intake air amount Mc(n) is injected.

However, the present embodiment limits variations of the air-fuel ratio A/F caused by changes in the intake valve closing timing IVC. This is because the fuel increased in amount from "Mc(n)·Fq" is injected under a condition in which the returned air amount is increased, and the fuel decreased in amount from "Mc(n)·Fq" is injected under a condition in which the returned air amount is decreased. When the injection timing correction coefficient ekainj is considered to be unchanged, the correction coefficient Kc may be considered to be unchanged. Therefore, "Kc(n)=Kc(n−1)=Kc." According to the expression (c6), the return correction amount ΔQ is calculated from expression (c7) described below.

$$\Delta Q(n) = Kq \cdot Kc \cdot Gr(n) - Kq \cdot Kc \cdot Gr(n-1) \qquad (c7)$$
$$= Kq \cdot Kc \cdot \{Gr(n) - Gr(n-1)\}$$

According to the expression (c7), when the returned air amount Gr(n) is increased from the preceding returned air amount Gr(n−1), the return correction amount ΔQ(n) is a positive value. When the returned air amount Gr(n) is decreased from the preceding returned air amount Gr(n−1), the return correction amount ΔQ(n) is a negative value. The relationship of the increase and decrease in the returned air amount and the positive and negative signs of the return correction amount ΔQ is consistent when the fuel injection mode subtly changes.

FIG. 10A shows the rotation speed NE, the intake valve closing timing IVC, the intake air amount AFM, the returned fuel amount Qr, the return correction amount ΔQ, and the air-fuel ratio A/F of the comparative example that does not perform the correction with the return correction amount ΔQ. FIG. 10B shows the rotation speed NE, the intake valve closing timing IVC, the intake air amount AFM, the returned fuel amount Qr, the return correction amount ΔQ, and the air-fuel ratio A/F of the present embodiment. As shown in FIG. 10A, in the comparative example, changes in the intake air amount AFM cause large variations of the air-fuel ratio A/F. However, as shown in FIG. 10B, the present embodiment limits variations in the air-fuel ratio A/F caused by changes in the intake air amount AFM. In FIGS. 10A and 10B, it is assumed that the changes in the intake air amount AFM do not cause any change in injection mode.

In the examples shown in FIGS. 10A and 10B, while the intake valve closing timing IVC is unchanged, the changes in the intake air amount AFM change the returned air amount Gr. This causes the changes in the returned fuel amount Qr. The reason why the air-fuel ratio A/F largely varies in the comparative example and the reason why the present embodiment limits variations in the air-fuel ratio A/F are the same as those described with reference to FIGS. 9A to 9C.

FIG. 11A shows the rotation speed NE, the intake valve closing timing IVC, the intake air amount AFM, the injection start timing ainj of the direct injection valve 26, the returned fuel amount Qr, the return correction amount ΔQ, and the air-fuel ratio A/F of the comparative example that does not perform the correction with the return correction amount ΔQ. FIG. 11B shows the rotation speed NE, the intake valve closing timing IVC, the intake air amount AFM, the injection start timing ainj of the direct injection valve 26, the returned fuel amount Qr, the return correction amount ΔQ, and the air-fuel ratio A/F of the present embodiment.

In the examples shown in FIGS. 11A and 11B, the intake valve closing timing IVC and the intake air amount AFM are unchanged, and the injection start timing ainj of the direct injection valve 26 is changed. This results in large variations of the air-fuel ratio A/F in the comparative example. In the present embodiment, variations of the air-fuel ratio A/F are limited. The changes in the injection start timing ainj of the direct injection valve 26 cause changes in the returned fuel amount Qr. Thus, in the present embodiment, the injection timing correction coefficient ekainj is used to calculate the returned fuel amount Qr.

More specifically, when "Gr(n)=Gr(n−1)," according to the expression (c6), the return correction amount ΔQ(n) may be reformed into expression (c8) described below.

$$\Delta Q(n) = Gr(n) \cdot Kq \cdot \{Kc(n) - Kc(n-1)\} \qquad (c8)$$

The correction coefficient Kc is set based on the injection timing correction coefficient ekainj. For example, when the injection is performed one time, the correction coefficient Kc is equal to the injection timing correction coefficient ekainj. When the injection start timing is retarded, as shown in FIG. 7, the injection timing correction coefficient ekainj is decreased so that "Kc(n)<Kc(n−1)." This indicates that the returned fuel amount Qr is decreased. Also, according to the expression (c8), in this case, the return correction amount ΔQ(n) is a negative value. Thus, the return correction amount ΔQ(n) compensates for the change in the returned fuel amount Qr.

The injection start timing ainj is a parameter that may change the value (absolute value) of the return correction amount ΔQ even when the returned air amount Gr changes in the same amount. More specifically, the injection timing correction coefficient ekainj has a smaller value when the injection start timing of the direct injection valve 26 is retarded than when advanced. Accordingly, the first fuel amount Q1 also has a smaller value, and the returned fuel amount Qr has a smaller value. Thus, according to the expression (c7), even when the returned air amount Gr changes in the same amount, the return correction amount ΔQ has a smaller value when the injection start timing is retarded than when advanced.

The present embodiment further has the advantages described below.

(1) The return correction amount ΔQ(n) is the value obtained from an exponential moving average. This copes with a situation in which the transition state, in which the returned air amount changes, affects a combustion cycle in which the change occurs and also the following combustion cycles.

(2) Under the above predetermined condition, a returned fuel amount assumed when the fuel is injected so that the mixture of the maximum air amount Gm(n) of air and fuel is controlled to the target value is used as the present returned fuel amount instead of a returned fuel amount obtained when the fuel is injected in an amount corresponding to the closed-valve intake air amount Mc(n). This limits deviations of the fuel amount in the returned mixture from the estimated value affected by the return correction amount ΔQ.

(3) The injection timing correction coefficient ekainj is variably set in accordance with the injection start timing ainj at which the direct injection valve 26 injects the fuel. The returned fuel amount Qr is calculated taking into consideration that when the injection start timing ainj is retarded, the amount of fuel that does not return to the intake passage 12 and remains in the combustion chamber 24 tends to be increased compared to when the injection start timing ainj is advanced. Additionally, the returned air amount Gr is calculated, and the returned fuel amount Qr is calculated based on the calculation. This tends to reduce the fitting steps compared to when the returned fuel amount Qr is calculated based on the injection start timing ainj and a parameter used to calculate the returned air amount Gr without calculating the returned air amount Gr. In the latter case, the input parameters are the intake pressure Pm, the intake valve closing timing IVC, the rotation speed NE, and the injection start timing ainj and thus are four-dimensional. For example, when map data is formed, the data amount will be larger than that of the present embodiment. More specifically, the data amount of the present embodiment corresponds to a data amount of two three-dimensional map data, which are map data calculating the returned air amount Gr and map data calculating the injection timing correction coefficient ekainj. In general, such a data amount is less than a data amount of four-dimensional map data. Further, the returned air amount Gr is a parameter having a strong positive correlation with the returned fuel amount Qr. The use of the returned air amount Gr easily projects which value is obtained as the return correction amount ΔQ.

(4) When the fuel is injected into a cylinder multiple times in one combustion cycle, the first injection amount instruction value Q*(1) is calculated based on the return correction amount ΔQ. This appropriately compensates for excess and shortage of the returned fuel amount.

(5) Under a condition in which the rotation speed NE is less than or equal to the predetermined speed, the fuel injection is performed using the return correction amount ΔQ. When the rotation speed NE is high, the returned fuel amount is decreased as compared to when the rotation speed NE is low. This may provide both the calculation load reduction and the maintenance of the accuracy for controlling the air-fuel ratio.

(6) When the fuel injection is started using the return correction amount ΔQ, the returned fuel amount Qr(n) is calculated for the first one of the cylinders. The first-calculated returned fuel amount Qr(n) is used as a substitute for the preceding returned fuel amount Qr(n−1) of the next one of the cylinders. This increases the controllability of the air-fuel ratio of the next cylinder as compared to when the substitute is not used.

Correspondence Relationship

The correspondence relationship between the elements in the above embodiment and the elements described in the "summary of the invention" is as follows.

[1] The returned air amount calculating process corresponds to the processes of S14 and S36. The operating process corresponds to the processes of S16 to S30. Additionally, "amount of fuel injected when the returned air amount is unchanged" corresponds to "Mc(n)·Kq·ekf(1)" when the preceding value of the injection timing correction coefficient ekainj is equal to the present value.

[2] The process for "variably setting in accordance with a fuel injection start timing of the fuel injection valve" corresponds to the process for setting the correction coefficient Kc based on the injection timing correction coefficient ekainj.

[3] The process for "injecting increased or decreased fuel after the next combustion cycle" corresponds to the process of S26.

[4] The valve property variable device corresponds to the intake-side VVT 44.

[5] The excess-shortage calculating process corresponds to the process of S24.

[6] The "process for increasing or decreasing a fuel amount of a first one of the multiple fuel injections" corresponds to the process for calculating the first injection amount instruction value Q*(1) based on the return correction amount ΔQ in the process of S28.

Other Embodiments

At least one of the elements in the above embodiment may be modified as follows.

Maximum Air Amount Calculating Process

In the above embodiment, the maximum air amount Gm is calculated based on the returned air amount Gr and the closed-valve intake air amount Mc. Instead, the maximum air amount Gm may be calculated, for example, using a gas equation. More specifically, for example, volume Vm of the combustion chamber 24 at the BDC timing, gas constant R, molar mass M(g/mol), and cylinder temperature Tm may be used in expression (c9) described below.

$$Gm = \{(Pm \cdot Vm)/(R \cdot Tm)\} \cdot M \cdot \{NE/(60 \cdot 2)\} \quad (c9)$$

The coolant temperature may be used as a substitute for the cylinder temperature Tm. The volume Vm may be a value obtained by subtracting the volume of the combustion chamber 24 at a TDC timing from the volume of the combustion chamber 24 at the BDC timing.

The maximum air amount Gm does not necessarily have to be the air amount obtained at the BDC timing. For example, the maximum value of the intake air amount obtained when the intake valve 18 is closed may be considered as the maximum air amount Gm. More specifically, for example, the maximum value may be the maximum value of each intake pressure Pm when the rotation speed NE is set to various values and the intake phase difference DIN is set to various values. In another example, the maximum value may be the maximum value of each rotation speed and intake pressure Pm when the intake phase difference DIN is set to various values.

Returned Air Amount Calculating Process

In the above embodiment, the intake valve closing timing IVC is used as one of the input parameters calculating the returned air amount Gr that indicates the valve property of the intake valve determining the valve closing timing. Instead, for example, the intake phase difference DIN may be used. In another example, as in the section of "Valve Property Variable Device" described below, when the lift amount is variable, the lift amount may be used as the input parameter.

For example, as described above in the section of "Maximum Air Amount Calculating Process," when the maximum air amount Gm is calculated without using the returned air amount Gr, the returned air amount Gr may be the difference between the maximum air amount Gm and the closed-valve intake air amount Mc.

As in the section of "Valve Property Variable Device" described below, when the valve property variable device is not provided, the parameter indicating the intake valve property is not necessary for the calculation of the returned air amount Gr. Additionally, for example, when an internal combustion engine is installed in a series hybrid car, the setting may be configured so that the dependency of the rotation speed NE is lowered, for example, by allowing for control limiting a possible range of rotation speeds of the engine. In such a case, the rotation speed NE does not necessarily have to be used in the calculation of the returned air amount Gr.

The input parameters of the returned air amount calculating process are not limited to the intake pressure or input parameters including the intake pressure and at least one of the parameter indicating the intake valve property determining the valve closing timing and the rotation speed NE. For example, the intake temperature may be added. An intake temperature sensor may be provided so that the detection value of the intake temperature sensor is used as the intake temperature.

The returned air amount calculating process is not limited to that performed based on the intake pressure. For example, the calculation may be performed based on the open degree TA or the estimated open degree TAe of the throttle valve 14, the intake phase difference DIN, and the rotation speed NE. This may be accomplished when the ROM 64 stores map data in which the open degree TA or the estimated open degree TAe, the intake phase difference DIN, and the rotation speed NE serve as input parameters, and the returned air amount Gr serves as an output parameter.

The returned air amount calculating process is not limited to that using the map data stored in the ROM 64. For example, the ROM 64 may store function data in which the input parameter is an independent variable and the output parameter is a dependent variable so that the function data is used in the returned air amount calculating process.

Excess and Shortage Calculating Process

The fuel amount Qr in the mixture that returns before the intake valve closes does not necessarily have to be calculated. For example, when the fuel is injected only from the port injection valve 16 and the fuel injection is completed before the intake valve 18 opens, the injection timing correction coefficient ekainj is considered to be one. In such a case, the configuration may be as follows. More specifically, the return correction amount $\Delta Q$ may be a value obtained based on the expression (c7) by multiplying the conversion coefficient Kq by the difference of the present returned air amount Gr(n) and the preceding returned air amount Gr(n−1). This is an example that calculates the return correction amount $\Delta Q$ without calculating the maximum air amount Gm, the first fuel amount Q1, and the second fuel amount Q2 in addition to the returned fuel amount Qr.

Intake Pressure Obtaining Technique

The intake pressure used, for example, in the calculation of the returned air amount Gr is not limited to a value estimated from the model (air model) shown in the example of FIG. 2. For example, when a target intake air amount, which is a target value of the closed-valve intake air amount Mc, is set in accordance with the accelerator operation amount ACCP, the target open degree TA* may be calculated from an inverse model (inverse air model) of the above air model in accordance with the target intake air amount. The target value of the intake pressure Pm, which is the intake pressure calculated in the inverse air model, may be used. In this case, taking into consideration a response delay, it is preferred that the target value of the intake pressure Pm is a value on which a low-pass filter process is performed. In another case, for example, when an intake pressure sensor is provided, the detection value of the intake pressure sensor may be used. In this case, a low-pass filter process may be performed on the detection value so that a value having reduced pulsing components is used.

Air Amount in Mixture that is Burned

In the above embodiment, the amount of air in the mixture that is burned in a cylinder one time in one combustion cycle is calculated as the closed-valve intake air amount Mc. Instead, for example, the closed-valve intake air amount Mc may be sequentially calculated in a cylinder in a cycle shorter than 720° C.A. In this case, for example, when the fuel is injected into a cylinder multiple times in one combustion cycle, the injection amount may be calculated using the closed-valve intake air amount Mc that is calculated at different timings for the first fuel injection and the second fuel injection.

The amount of air in the mixture that is burned is not limited to that calculated using the air model. For example, when the inverse air model is used as described above in the section of "Intake Pressure Obtaining Technique," the target intake air amount may be used. In another example, when an intake pressure sensor is provided, the calculation may be performed using map data or function data in which the detection value of the intake pressure sensor, the rotation speed NE, and the intake phase difference DIN serve as input parameters and the amount of air in the mixture that is burned serves as an output parameter.

Injection Timing Correction Coefficient

In the above embodiment, only when the direct injection valve 26 is used, the injection timing correction coefficient ekainj is set to a value differing from one. Instead, for example, even when the port injection valve 16 is used, if the injection is performed while the intake valve 18 is open, the injection timing correction coefficient ekainj may be set to a value differing from one. In this case, as the injection timing is retarded, the injection timing correction coefficient ekainj is set to a value greater than one.

Operating Process

In the above embodiment, the subject that undergoes the correction with the return correction amount ΔQ is the first fuel injection. Instead, for example, when the first fuel injection and the second and following fuel injections use the same injection timing correction coefficient ekainj that is greater than zero, the correction subject may be the second and following fuel injections.

The process for calculating the return correction amount ΔQ(n) based on the difference of the present returned air amount Gr(n) and the preceding returned air amount Gr(n−1) is not limited to that described in the section of "Excess and Shortage Calculating Process." For example, when only the direct injection valve 26 is used, the ROM 64 may store map data in which the difference described above and preceding and present values of the injection start timing ainj of the direct injection valve 26 serve as input parameters, and the return correction amount ΔQ serves as an output parameter. The CPU 62 may use the map data to perform a map calculation. The map data sets the return correction amount ΔQ to a larger value when "Gr(n)−Gr(n−1)" is large than when small. Additionally, if the preceding value of the injection start timing ainj of the direct injection valve 26 is equal to the present value, the map data sets the absolute value of the return correction amount ΔQ to a larger value when the injection start timing ainj of the direct injection valve 26 is advanced than when retarded. When the port injection valve 16 is used, the input parameters may further include the preceding and present values of the injection start timing ainj. Instead of the injection start timing ainj of the direct injection valve 26, the injection start timing ainj of the port injection valve 16 may be used as an input parameter.

The process for injecting the fuel increased in amount from an amount of fuel injected when the returned air amount Gr is unchanged under a condition in which the returned air amount Gr is increased, and injecting the fuel decreased in amount from the amount of fuel injected when the returned air amount Gr is unchanged under a condition in which the returned air amount Gr is decreased is not limited to that using the injection amount instruction value Q*, which is corrected with the return correction amount ΔQ. For example, an injection time may be calculated from an injection amount instruction value Q* that is free from the correction with the return correction amount ΔQ. The injection time may be corrected so that the injection time extends under a condition in which the returned air amount Gr is increased and shortens under a condition in which the returned air amount Gr is decreased.

In the above embodiment, the condition (con1) is provided as the execution condition of the correction process using the return correction amount ΔQ. However, there is no limit to such a configuration.

Increase and Decrease in Fuel Amount

In the above embodiment, a value obtained by multiplying the amount of air in a mixture that is burned by the conversion coefficient Kq and the injection rate ekf, that is, the fuel amount corresponding to the air amount in the mixture, is used as the fuel amount that is increased or decreased by the return correction amount ΔQ. Instead, for example, when fuel is injected in a combustion cycle and some of the injected fuel collects on the intake passage 12 or the wall surface of the cylinder 20 in the combustion cycle, an increase correction amount that compensates for the shortage amount due to the collection may be added to the fuel amount corresponding to the air amount in a mixture that is burned. Alternatively, the fuel amount corresponding to the air amount in a mixture that is burned may be corrected by an operation amount of feedback control for controlling the air-fuel ratio A/F to the target value.

Air Model

The actual open degree TA does not necessarily have to be controlled to the delay open degree TAr. When the actual open degree TA is not controlled to the delay open degree TAr, for example, the closed-valve intake air amount Mc corresponding to the predetermined later period may be estimated as follows. More specifically, when the target open degree TA* is increased, an estimated value TAf of the open degree corresponding to a predetermined later time ΔT is set to "TA+ΔTA" where TA represents the present open degree and ΔTA represents a predetermined amount. When the target open degree TA* is decreased, the estimated value TAf of the open degree of the predetermined later time ΔT is set to "TA−ΔTA." The intake pressure Pm of the predetermined later time ΔT is estimated based on the above. Next, in the same manner, an estimated value of the open degree of "2·ΔT" is considered as a value obtained by changing the open degree TA by "2·ΔTA," and the intake pressure of "2·ΔT" is estimated. Such processes are repeated N (>2) times to estimate the intake pressure of "N·ΔT."

In the above embodiment, the intake phase difference DIN is used as an input parameter of the intake valve models M26, M38, and M34. Instead, for example, the target intake phase difference DIN* may be used. In another example, a value obtained by performing a low-pass filter process on the target intake phase difference DIN* may be used.

In the process of FIG. 2, instead of using the correction amount ΔPm, the intake pressure Pmt may be used to calculate the closed-valve intake air amount Mc.

For example, as described below in the section of "Others," when the internal combustion engine 10 does not include the throttle valve 14, the intake air amount AFM may be used instead of the throttle flow rates mt1 and mt2 described above.

Controller

The controller is not limited to that including the CPU 62 and the ROM 64 and executing software processes. For example, a dedicated hardware circuit (e.g., ASIC) may be provided to at least part of the software processes executed in the above embodiment. More specifically, the controller may have any one of the following configurations (a) to (c). Configuration (a) includes a processing device executing all of the above processes in accordance with programs and a program storage device storing the programs such as a ROM. Configuration (b) includes a processing device executing part of the above processes in accordance with programs, a program storage device, and a dedicated hardware circuit executing the remaining processes. Configuration (c) includes a dedicated hardware circuit executing all of the above processes. Further, multiple software processing circuits including a processing device and a program storage device and multiple dedicated hardware circuits may be used. That is, the above processes may be executed by processing circuitry including at least one of one or multiple software processing circuits and one or multiple dedicated hardware circuits. The program storage device, or a computer readable medium, includes any available medium that is accessible by a versatile or dedicated computer.

Valve Property Variable Device

The valve property variable device is not limited to the intake-side VVT 44, which changes the valve opening timing while keeping changes in lift amount constant with respect to changes in open duration of the intake valve 18 and rotation angle. For example, the variable property variable device may change the maximum lift amount of the intake valve. In this case, the setting may be provided so that, for example, a retardation of the valve closing timing caused by change in maximum lift amount increases the returned air amount, and an advancement of the valve closing timing caused by change in maximum lift amount decreases the returned air amount. Thus, increasing or decreasing of the injection amount based on the returned air amount Gr is effective.

A valve property variable device does not necessarily have to be provided. Even without a valve property variable device, when the closing timing of the intake valve 18 is after the bottom dead center timing, for example, an increase in the open degree of the throttle valve 14 may cause an increase in the amount of air drawn into the cylinder when the intake valve 18 is closed. In this case, the returned air amount also increases. Thus, increasing or decreasing of the injection amount based on the returned air amount Gr is effective.

Others

The internal combustion engine 10 does not necessarily have to include the throttle valve 14. The internal combustion engine 10 does not necessarily have to include both the port injection valve 16 and the direct injection valve 26 and may include one of them. For example, when the closed-valve intake air amounts Mc and Mc1 to Mc3 are quantified based on a load ratio, the load ratio KL may be the closed-valve intake air amount Mc3.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes a fuel injection valve that injects fuel to supply the fuel into a combustion chamber, an intake passage connected to the combustion chamber, and an intake valve that opens and closes the intake passage, and the internal combustion engine is configured to allow a closing timing of the intake valve to be retarded from a bottom dead center timing, the controller comprising processing circuitry configured to execute:
a calculating process that calculates a returned air amount, which is an amount of air that flows into the combustion chamber and returns to the intake passage before the intake valve closes;
a calculating process that calculates a returned fuel amount by multiplying a first fuel amount, which is calculated based on a maximum air amount that is a maximum value of an amount of air flowing into the combustion chamber in one combustion cycle, by a value obtained by dividing the returned air amount by the maximum air amount;
a calculating process that calculates a return correction amount based on the first fuel amount, a second fuel amount, and a previous cycle's returned fuel amount, the second fuel amount being calculated based on a closed-valve intake air amount; and
an operating process that operates the fuel injection valve to inject fuel, an amount of the injected fuel being obtained by correcting the second fuel amount using the return correction amount, so that an air-fuel ratio of a mixture that is burned in the combustion chamber is controlled to a target value, wherein the operating process includes
under a condition in which the returned air amount is increased, having the fuel injection valve inject fuel increased in amount from a constant fuel amount, wherein the constant fuel amount is an amount of fuel injected when the returned air amount is unchanged, and
under a condition in which the returned air amount is decreased, having the fuel injection valve inject fuel decreased in amount from the constant fuel amount.

2. The controller for an internal combustion engine according to claim 1, wherein the operating process includes variably setting a fuel amount to be increased from the constant fuel amount and a fuel amount to be decreased from the constant fuel amount in accordance with a fuel injection start timing of the fuel injection valve.

3. The controller for an internal combustion engine according to claim 1, wherein the operating process includes
under a condition in which the returned air amount is increased, having the fuel injection valve inject fuel increased in amount from the constant fuel amount in a combustion cycle in which the returned air amount is increased and following combustion cycles, and
under a condition in which the returned air amount is decreased, having the fuel injection valve inject fuel decreased in amount from the constant fuel amount in a combustion cycle in which the returned air amount is decreased and following combustion cycles.

4. The controller for an internal combustion engine according to claim 1, wherein
the internal combustion engine includes a valve property variable device that variably sets a closing timing of the intake valve,
the calculating process includes calculating the returned air amount based on intake pressure and a parameter indicating a valve property of the intake valve determining the closing timing, and
the calculated returned air amount increases as the closing timing is retarded and also increases as the intake pressure is increased.

5. The controller for an internal combustion engine according to claim 1, wherein the operating process includes
calculating a difference obtained by subtracting a fuel amount in a mixture returned to the intake passage before the intake valve closes in a preceding cycle from a fuel amount in a mixture returned to the intake passage before the intake valve closes in a present cycle,
operating the fuel injection valve so that when the difference is a positive value, the fuel injection valve injects fuel increased in amount from a fuel amount injected when the difference is zero, and
operating the fuel injection valve so that when the difference is a negative value, the fuel injection valve injects fuel decreased in amount from a fuel amount injected when the difference is zero.

6. The controller for an internal combustion engine according to claim 5, wherein the operating process includes
operating the fuel injection valve to perform multiple fuel injections in one combustion cycle so that an air-fuel ratio of a mixture that is burned in the combustion chamber is controlled to the target value, and
increasing or decreasing a fuel amount of a first one of the multiple fuel injections from a fuel amount injected when the difference is zero.

7. The controller for an internal combustion engine according to claim 6, wherein
the fuel injection valve includes a direct injection valve that injects fuel into the combustion chamber, and
the processing circuitry is configured to have the direct injection valve perform a last one of the multiple fuel injections.

8. A method for controlling an internal combustion engine, wherein the internal combustion engine includes a fuel injection valve that injects fuel to supply the fuel into a combustion chamber, an intake passage connected to the combustion chamber, and an intake valve that opens and closes the intake passage, and the internal combustion engine is configured to allow a closing timing of the intake valve to be retarded from a bottom dead center timing, the method comprising:
calculating a returned air amount, which is an amount of air that flows into the combustion chamber and returns to the intake passage before the intake valve closes;
calculating a returned fuel amount by multiplying a first fuel amount, which is calculated based on a maximum air amount that is a maximum value of an amount of air flowing into the combustion chamber in one combustion cycle, by a value obtained by dividing the returned air amount by the maximum air amount;
calculating a return correction amount based on the first fuel amount, a second fuel amount, and a previous cycle's returned fuel amount, the second fuel amount being calculated based on a closed-valve intake air amount; and
operating the fuel injection valve to inject fuel, an amount of the injected fuel being obtained by correcting the second fuel amount using the return correction amount, so that an air-fuel ratio of a mixture that is burned in the combustion chamber is controlled to a target value, wherein the operating the fuel injection valve includes
under a condition in which the returned air amount is increased, having the fuel injection valve inject fuel increased in amount from a constant fuel amount, wherein the constant fuel amount is an amount of fuel injected when the returned air amount is unchanged, and
under a condition in which the returned air amount is decreased, having the fuel injection valve inject fuel decreased in amount from the constant fuel amount.

* * * * *